(12) United States Patent
Sun et al.

(10) Patent No.: US 9,349,072 B2
(45) Date of Patent: May 24, 2016

(54) LOCAL FEATURE BASED IMAGE COMPRESSION

(71) Applicant: Microsoft Technology Licensing, LLC, Redmond, WA (US)

(72) Inventors: Xiaoyan Sun, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 13/793,992

(22) Filed: Mar. 11, 2013

(65) Prior Publication Data

US 2014/0254936 A1    Sep. 11, 2014

(51) Int. Cl.
*G06K 9/48* (2006.01)
*G06T 9/00* (2006.01)
*H04N 19/00* (2014.01)

(52) U.S. Cl.
CPC ... *G06K 9/48* (2013.01); *G06T 9/00* (2013.01); *H04N 19/00* (2013.01)

(58) Field of Classification Search
USPC .................................................. 382/195, 243
See application file for complete search history.

(56) References Cited

U.S. PATENT DOCUMENTS

| 2010/0246969 | A1* | 9/2010 | Winder et al. | 382/195 |
| 2010/0303354 | A1* | 12/2010 | Reznik | 382/168 |
| 2011/0085728 | A1* | 4/2011 | Gao et al. | 382/165 |
| 2012/0076401 | A1* | 3/2012 | Sanchez et al. | 382/159 |
| 2012/0155536 | A1* | 6/2012 | Pace | 375/240.08 |
| 2014/0321765 | A1* | 10/2014 | Iwamoto | H04N 19/54 382/243 |

FOREIGN PATENT DOCUMENTS

WO   WO9713372   4/1997

OTHER PUBLICATIONS

Armbrust, et al., "A view of cloud computing", Communications of the ACM, vol. 53, No. 4, Apr. 2010, pp. 50-58.
Bay, et al., "Speeded-up robust features (SURF)", in Computer Vision and Image Understanding, vol. 110, Jun. 2008, pp. 346-359.
Bertalmio, et al.,"Image Painting", SIGGRAPH, Jul. 2000, 8 pages.
Boykov, et al., "Interactive Graph Cuts for Optimal Boundary and Region Segmentation of Objects in N-D Images", IEEE Conference on Computer Vision, Dec. 2001, 8 pages.

(Continued)

*Primary Examiner* — Ishrat I Sherali
(74) *Attorney, Agent, or Firm* — Sandy Swain; Micky Minhas; Lee and Hayes, PLLC

(57) ABSTRACT

The use of local feature descriptors of an image to generate compressed image data and reconstruct the image using image patches that are external to the image based on the compressed image data may increase image compression efficiency. A down-sampled version of the image is initially compressed to produce an encoded visual descriptor. The local feature descriptors of the image and the encoded visual descriptor are then obtained. A set of differential feature descriptors are subsequently determined based on the differences between the local feature descriptors of the input image and the encoded visual descriptor. At least some of the differential feature descriptors are compressed to produce encoded feature descriptors, which are then combined with the encoded visual feature descriptor produce image data. The image data may be used to select image patches from an image database to reconstruct the image.

20 Claims, 8 Drawing Sheets

(56) References Cited

OTHER PUBLICATIONS

Chandraschkhar, et al., "CHoG Compressed histogram of gradients a low bit-rate feature descriptor", IEEE Conference on Computer Vision and Pattern Recognition, Jun. 2009, pp. 2504-2511.
Chandraschkhar, et al., "Compressed histogram of gradients a low-bitrate descriptor", International Journal of Computer Vision, vol. 96, Issue 3, Feb. 2012, pp. 384-399.
Chandrasekhar, et al., "Transform coding of image feature descriptors", SPIE Conference on Visual Communication and Image Processing, vol. 7257, Jan. 2009, 9 pages.
Chao, et al., "Preserving SIFT Features in JPEG-encoded images", 18th IEEE International Conference on Image Processing, Sep. 2011, pp. 309-312.
Chen, et al., "Local Image Descriptor using VQ-SIFT for Image Retrieval", Proceedings of World Academy of Science, Engineering and Technology, Issue 59, Nov. 2011, pp. 622-626.
Chen, et al., "PhotoSketch Internet Image Montage", SIGGRAPH ASIA 2009, Dec. 2009, 10 pages.
Chum, et al., "Matching with PROSAC—progressive sample consensus", IEEE Conference on Computer Vision and Pattern Recognition (CVPR), Jun. 2005, 7 pages.
Chum, et al., "Total recall: automatic query expansion with a generative feature model for object retrieval", IEEE 11th International Conference on Computer Vision, Oct. 2007, 8 pages.
Dai, et al., "IMShare: Instantly Sharing Your Mobile Landmark Images by Search-based Reconstruction", ACM Multimedia'12, Oct.-Nov. 2012, 10 pages.
Daneshi, et al., "ImageReconstructionBasedOnLocalFeatureDescriptors", retreived Apr. 2013 from <<http://www.stanford.edu/class/ee368/Project_11/Reports/Daneshi_Guo_Image_Reconstruction_from_Descriptors>>, available as early as 2011, 6 pages.
Davis, et al., "MMM2: Mobile Media Metadata for Media Sharing", CHI 2005, Apr. 2005, 4 pages.
Doxygen, "HVEC Test Model (HM) Documentation", retreived on Oct. 10, 2013 from <<http://www.heve.info/HM-doc>>, 1 page.
Edelman, et al., "Complex cells and object recognition", NIPS, Visual Processing, Dec. 1997, 7 pages.
Eitz et al., "Photosketch a sketch based image query and compositing system", SIGGRAPH 2009, Aug. 2009, 1 page.
Eitz, et al., "Photosketcher: interactive sketch-based image synthsis", IEEE Journal of Computer Graphics and Applications, vol. 31, Issue 6, Jul. 2011, 9 pages.
Farbman, et al., "Convolution pyramids", SIGGRAPH ASIA, Dec. 2011, 8 pages.
Felzenszwalb, et al., "Efficient Graph-Based Image Segmentation", International Journal of Computer Vision, vol. 59 (2), Aug. 2004, pp. 167-181.
Fischler, et al., "Random Sample Consensus: A Paradigm for Model Fitting with Applications to Image Analysis and Automated Cartography", Communications of the ACM, vol. 24, No. 6, Jun. 1981, pp. 381-395.
"Flickr.com", Webpage retreived on Oct. 10, 2013 from <<http://www.flickr.com>>, 5 pages.
Google Developers, "Google Street View Image API", Googel Maps Image APIs, Feb. 13, 2013, 4 pages.
Hays, et al. "Scene Completion Using Millions of Photographs", ACM SIGGRAPH 2007, 2007, 7 pages.
Hua, et al., "Discriminant embedding for local image descriptors", IEEE Conference on Computer Vision, Oct. 2007, 8 pages.
InfranView, "InfranView Software—Official Homepage", retreived on Oct. 10, 2013 from <<www.infranview.com>>, 1 page.
ITU, "Methodology for the subjective assessment of the qulity of television pictures", Recommendation ITU-R BR.500-11, Jun. 2000, 48 pages.
Jegou, et al., "Hamming Embedding and Weak Geometric Consistency for Large Scale Image Search", European Conference on Computer Vision, Oct. 2008, 15 pages.
Jegou, et al., "INRIA Holidays dataset", INRIA, Jan. 2008, 5 pages.
Jegou, et al., "Product Quantization for Nearest Neighbor Search", IEEE Transactions on Pattern Analysis and Machine Intelligence, vol. 33, No. 1, Jan. 2011, 12 pages.
Ji, et al."Towards low bit rate mobile visual search with mutiple-channel coding", ACM Conference on Multimedia, Nov.-Dec. 2011, 10 pages.
Johnson, et al., "CG2Real Improving the realism of computer generated images", IEEE Trans. on Visualization and Computer Graphics, vol. 17, Issue 9, Sep. 2011, 10 pages.
Kassim, et al., "Hierarchical Segmentation-Based Image Coding Using Hybrid Quad-Binary Trees", IEEE Transactions on Image Processing, vol. 18, No. 6, Jun. 2009, pp. 1284-1291.
Ke, et al., "An efficient parts based near duplicate and sub-image retreival system", ACM Multimedia, Oct. 2004, 8 pages.
Ke, et al., "PCA-SIFT: A More Distinctive Representation for Local Image Descriptors", IEEE Conference on Computer Vision and Pattern Recognition, Jun.-Jul. 2004, 8 pages.
Kwatra, et al., "Graphcut Textures: Image and Video Synthesis Using Graph Cuts", SIGGRAPH 2003, Jul. 2003, 10 pages.
Lew, et al., "Content-Based Multimedia Information Retrieval: State of the Art and Challenges", ACM Transactions on Multimedia Computing, Communications, and Applications, Feb. 2006, 26 pages.
Liu,et al., "Edge-Oriented Uniform Intra Prediction", IEEE Transactions on Image Processing, vol. 17, No. 10, Oct. 2008, pp. 1827-1836.
Lowe, "Distinctive Image Features from Scale-Invariant Keypoints", International Journal of Computer Vision, vol. 60, No. 2, pp. 91-110, 2004.
Makar, et al., "Compression of Image Patches for Local Feature Extraction", Proceedings of the IEEE International Conference on Acoustics, Speech and Signal Processing, Apr. 2009, 4 pages.
Marlow, et al., "HT06, Tagging Paper, Taxonomy, Flickr, Academic Article, to Read", Conference on Hypertext and Hypermedia, Aug. 2006, pp. 31-39.
Nasrabadi, et al., "Image Coding Using Vector Quantization: A Review", IEEE Trans. Commun., vol. COM-36, Aug. 1988, 15 pages.
Perez, et al., "Poisson Image Editing", SIGGRAPH 2003 ACM, Jul. 2003, 6 pages.
Philbin, et al., "Lost in Quantization: Improving Particular Object Retrieval in Large Scale Image Database", IEEE Conference on CVPR, Jun. 2008, 8 pages.
Philbin, et al., "Object Retrieval with Large Vocabularies and Fast Spatial Matching", IEEE Conference on Computer Vision and Pattern Recognition, Jun. 2007, 8 pges.
Qui, et al., "Image coding based on visual vector quantization", IEE Conference on Image Processing and It's Applications, Jul. 1995, pp. 301-305.
Reid, et al. "Second-Generation Image Coding: An Overview", ACM Computing Surveys, vol. 29, No. 1, Mar. 1997, 14 pages.
Rui, et al., "Image retrieval: current techniques, promising directions, open issues", Journal of Visival Communication and Image Representation, vol. 10, Issue 1, Mar. 1999, pp. 39-62.
Saghri, et al., "Image Quality Measure Base on a Human Visual System Model", Optical Engineering, vol. 28, No. 7, Jul. 1989, pp. 813-818.
Sarvas, et al., Mob-Share Controlled and immediate sharing of mobile images, ACM Conference on Multimedia, Oct. 2004, 8 pages.
Shao, et al., "ZuBuD-Zurich buildings database for image based recognition", Technical Report No. 260, ETH Zurich, Apr. 2003, 3 pages.
Sivic, et al., "Video Google: A Text Retrieval Approach to Object Matching in Videos", IEEE Conference on Computer Vision, vol. 2, Jun. 2003, 8 pages.
Smith, et al., "VisualSEEk: A Fully Automated Content-Based Image Query System", ACM Multimedia, Nov. 20, 1996, 12 pages.
Sullivan, et al., "Recent developments in standardization of high efficiency video coding (HEVC)", SPIE Applications of Image Processing, XXXIII, vol. 7798, Aug. 2010, 7 pages.
Szeliski, Richard, "Image Alignment and Stitching: A Tutorial", Foundations and Trends in Computer Graphics and Vision, vol. 2, 2012, 89 pages.
Tang, et al., "Near-lossless video summarization", ACM Conference on Multimedia, Oct. 2009, pp. 351-360.

(56) References Cited

OTHER PUBLICATIONS

Torr, et al., "IMPSAC sysnthesis of importance sampling and random sample consensus", Microsoft Research Technical Report MSR-TR-2002-99, Oct. 2002, 17 pages.

Torr, et al., "MLESAC a new robust estimator with application to estimating image geography", Journal of Computer Vision and Image Understanding, vol. 78, Apr. 2000, 19 pages.

Wallace, et al., "The JPEG still picture compression standard", IEEE Transactions on Consumer Electronics, Dec. 1991, a revised version of which appeared Communications of the ACM, Apr. 1991, 17 pages.

Wang, et al., "MindFinder: Image Search by Interactive Sketching and Tagging", WWW, Apr. 26-30, 2010, 4 pages.

Weinzaepfel, et al., "Reconstructing an image from its local descriptors", in Computer Vision and Pattern Recognition, Feb. 2011, 8 pages.

Whyte, et al., "Get out of my picture! Internet-based Inpainting", BMVC, Sep. 2009, 11 pages.

Wiegand, et al., "Overview of the H.264/AVC Video Codiing Standard", IEEE Transactions on Crcuits and Systems for Video Technology, Jul. 2003, 19 pages.

Wiegand, et al., "WD1: Working Draft 1 of High Efficiency Video Coding", Joint Collaborative Team on Video Coding (JCT-VC) of ITU-T SG16 WP3 and ISO/IEC JC1/SC29/WG11, Oct. 2011, 137 pages.

Wu, et al., "Bundling Features for Large Scale Partial-Duplicate Web Image Search", IEEE Conference on Computer Vision and Pattern Recognition, Jun. 2009, 8 pages.

Wu, et al., "Image compression by visual pattern vector quantization (VPVQ)", Data Compression Conference, Mar. 2008, pp. 123-131.

Yeo, et al., "Rate efficient visual correspondences using random projections", IEEE International Conference on Image Processing (ICIP), Oct. 2008, pp. 217-220.

Yue, et al., "Cloud-based Image Coding for Mobile Devices—Toward Thousands to One Compression", IEEE Transactions on Multimedia, Jan. 2013, 12 pages.

Yue, et al., "Sift-Based Image Compression , IEEE International Conference on Multimedia and Expo", Jul. 2012, pp. 473-478.

Zheng, et al., "Effective and efficient object-bsed image retrieval using visual phrases", ACM Multimedia, Oct. 2006, pp. 77-80.

Zhou, et al., "Scalar Quantization for large scale image search", ACM Multimedia, Oct.-Nov. 2012, pp. 169-178.

Zhou, et al., "Spatial coding for large scale partial-duplicate web image search", ACM Conference on Multimedia, Oct. 2010, pp. 511-520.

\* cited by examiner

LOCAL FEATURE BASED IMAGE COMPRESSION

BACKGROUND

Image compression reduces the sizes of image files for ease of storage and transfer. Some image compression schemes may rely on statistical correlation among pixels of an image to achieve compression. Techniques such as increasing the number of prediction directions, as well as the use of partitions and transforms have increased compression coding efficiency of these image compression schemes. The use of such techniques often significantly increases the complexity of both image encoders and image decoders for relative small gains in coding efficiency.

Other image compression schemes may take into account visual redundancy in addition to statistical redundancy. These schemes may compress an image by identifying and utilizing features within the image to achieve higher coding efficiency. For example, edge-based and segmentation-based coding schemes take into account the human eye's ability to identify edges and group similar regions of an image. However, the lack of development in edge and segmentation detection tools may limit the efficacy and efficiency of these image compression schemes.

SUMMARY

Described herein are techniques for using local feature descriptors of an image to generate compressed image data, as well as reconstructing the image using image patches that are external to the image based on the compressed image data. The characterization of an image region of the image by a local feature descriptor may be invariant to scale and rotation. During compression of an image, an encoder may obtain at least two types of descriptors from the image. A first type is a visual descriptor in the form of a down-sampled version of the image with embedded key feature descriptors. A second type is a group of differential feature descriptors that are formed from the visual descriptor and local feature descriptors of the image. These two types of descriptors are combined to generate compressed image data.

During the reconstruction of the image from the compressed image data, a decoder may recreate the local feature descriptors of the image based on the visual descriptor and the differential feature descriptors in the compressed image data. The decoder may further perform descriptor-based matching using the recreated local feature descriptors to retrieve candidate image patches from an image database. The decoder may integrate these candidate image patches to form a reconstruction of the image.

Accordingly, the techniques make use of visual correlation among multiple images to compress and reconstruct an image. Such techniques may reduce the amount of visual redundancy and provide efficient compression of images without resorting to the increased computational complexity associated with current image compression schemes.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are techniques for using local feature descriptors of an image to generate compressed image data, as well as reconstructing the image using image patches that are external to the image based on the compressed image data. The characterization of an image region of the image by a local feature descriptor may be invariant to scale and rotation. One example type of local feature descriptors may be Scale Invariant Feature Transform (SIFT) descriptors of the image.

During compression of an image, an encoder may obtain at least two types of descriptors from the image. A first type is a visual descriptor in the form of a down-sampled version of the image with embedded key feature descriptors. A second type is a group of differential feature descriptors that are formed from the visual descriptor and local feature descriptors of the image. These two types of descriptors are combined to generate compressed image data.

During the reconstruction of the image from the compressed image data, a decoder may recreate the local feature descriptors of the image based on the visual descriptor and the differential feature descriptors in the compressed image data. The decoder may further perform descriptor-based matching using the recreated local feature descriptors to retrieve candidate image patches from an image database. The decoder may integrate these candidate image patches to form a reconstruction of the image.

Accordingly, the techniques make use of visual correlation among multiple images to compress and reconstruct an image. Such techniques may reduce the amount of visual redundancy and provide efficient compression of images without resorting to the increased encoding computational complexity associated with current image compression schemes. Examples of techniques for using local feature vectors to generate compressed image data and recreate the image based on the compressed image data in accordance with various embodiments are described below with reference to FIGS. 1-8.

Example Scheme

Figure 1:
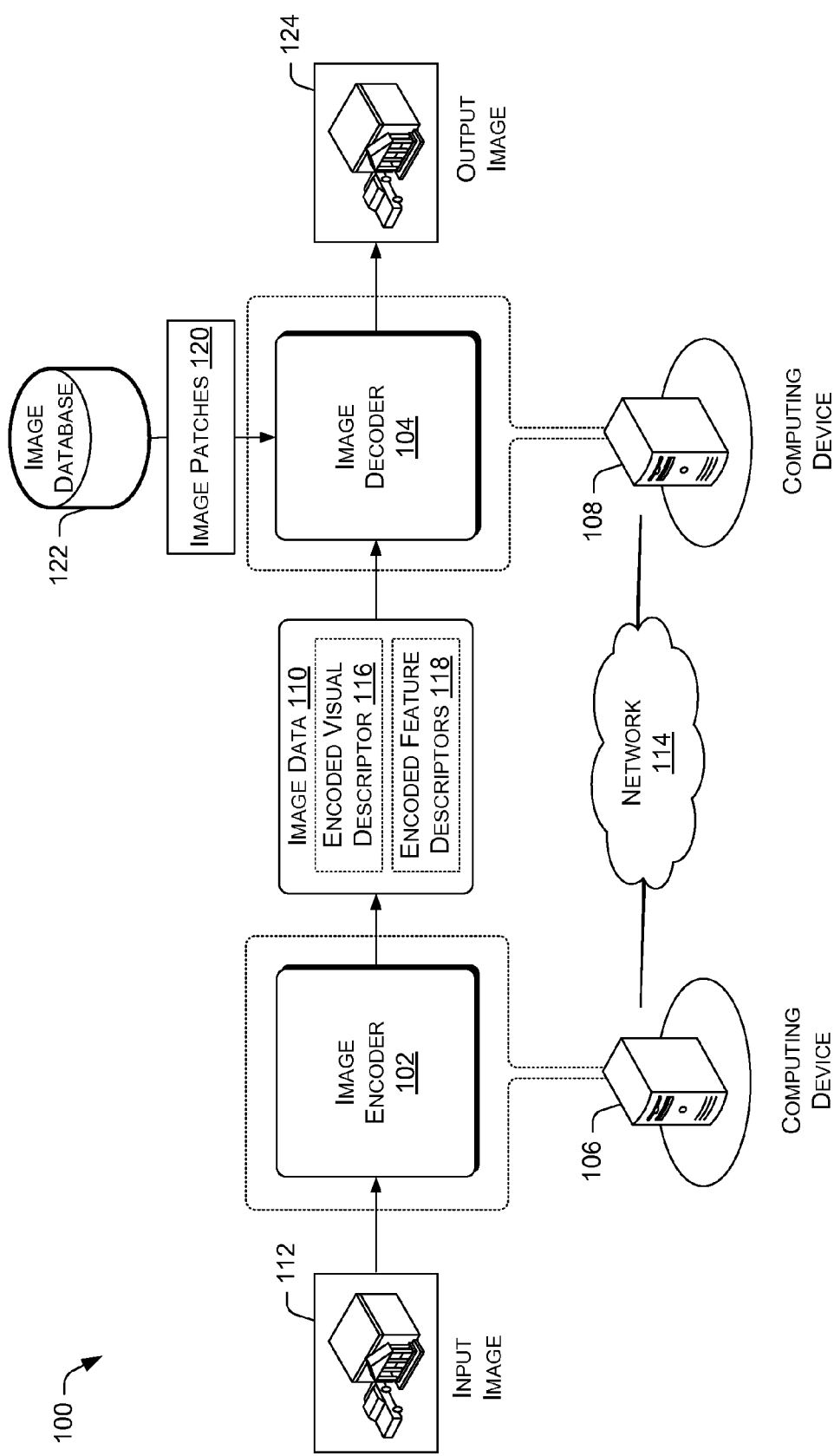
FIG. 1 is a block diagram that illustrates an example scheme for implementing an encoder that uses local feature descriptors of an image to generate compressed image data, and a decoder that reconstructs the image based on the compressed image data and an image database.

FIG. 1 is a block diagram that illustrates an example scheme 100 for implementing an encoder that uses local feature descriptors of an image to generate compressed image data, and a decoder that reconstructs the image based on the compressed image data and an image database. The example scheme 100 may include an image encoder 102 and an image decoder 104.

The image encoder 102 may be implemented by a computing device 106. Likewise, the image decoder 104 may be implemented by a computing device 108. In some embodiments, each of the computing device 106 and the computing device 108 may be a general purpose computer, such as a desktop computer, a tablet computer, a laptop computer, one or more servers, and so forth. However, in other embodiments, the computing device 106 may be one of a smart phone, a game console, a personal digital assistant (PDA), or any other electronic device that interacts with a user via a user interface.

The image encoder may produce compressed image data 110 for an input image 112. The compressed image data 110 may include an encoded visual descriptor 116 and encoded feature descriptors 118. The visual descriptor may be a downsampled version of the input image 112 that is embedded with key feature descriptors. The encoded feature descriptors 118 may include differential feature descriptors that are partially derived from local feature descriptors of the input image 112. The local feature descriptors may characterize corresponding image regions in the input image 112, in which the local feature descriptors are invariant to the scaling and rotation of the input image 112. In some embodiments, the local feature descriptors may be Scale Invariant Feature Transform (SIFT) descriptors of the image. In other embodiments, the local feature descriptors may be Speeded Up Robust Feature (SURF) descriptors. In additional embodiments, the local feature descriptors may be other types of local feature descriptors.

The image decoder 104 may receive the compressed image data 110 from the image encoder 102 via a network 114 that connects the computing device 106 to the computing device 108. The network 114 may be a local area network ("LAN"), a larger network such as a wide area network ("WAN"), and/or a collection of networks, such as the Internet. Protocols for network communication, such as TCP/IP, may be used to implement the network 114. The network 114 may be implemented using various wireless communication interface technology (e.g., cellular, Wi-Fi, Ultrawideband, Bluetooth, satellite transmissions), and/or the like. Alternatively or concurrently, the network 114 may also be implemented using various wired communication technology, such as LAN Ethernet, WAN Ethernet, a universal serial bus (USB), a high speed serial bus, and/or the like.

The image decoder 104 may decode each of the encoded visual descriptor 116 and the encoded feature descriptors 118. The visual descriptor and the differential feature descriptors that are produced by the decoding may be used by the image decoder 104 to recreate the local feature descriptors of the input image 112. Subsequently, the image decoder 104 may perform descriptor-based matching using the recreated local feature descriptors to select candidate image patches 120 from an image database 122. The image database 122 may include image patches that are stored in one or more cloud servers. Alternatively or concurrently, the image database 122 may include image patches that are stored on a computing device, such as the computing device 106 or the computing device 108. The image decoder 104 may further integrate the candidate image patches 120 to create an output image 124. In various embodiments, the output image 124 may be identical or similar in appearance to the input image 112.

In this way, the use of the compressed image data 110 may enable the computing device 106 to transfer the input image 112 to the computing device 108 while reducing the amount of network bandwidth used to accomplish the transfer. As such, network congestion due to the transfer of large image files may be reduced or eliminated. While each of the image encoder 102 and the image decoder 104 are illustrated as standalone components, each of these components may also be integrated with other applications in other embodiments. For example, the image encoder 102 may be part of an image generation or editing application, and the image decoder 104 may be part of a web browser or image viewing application. Further, while the image encoder 102 and the image decoder 104 are illustrated as being implemented by separate devices, these components may be implemented by a single computing device in some embodiments.

Example Components

Figure 2:
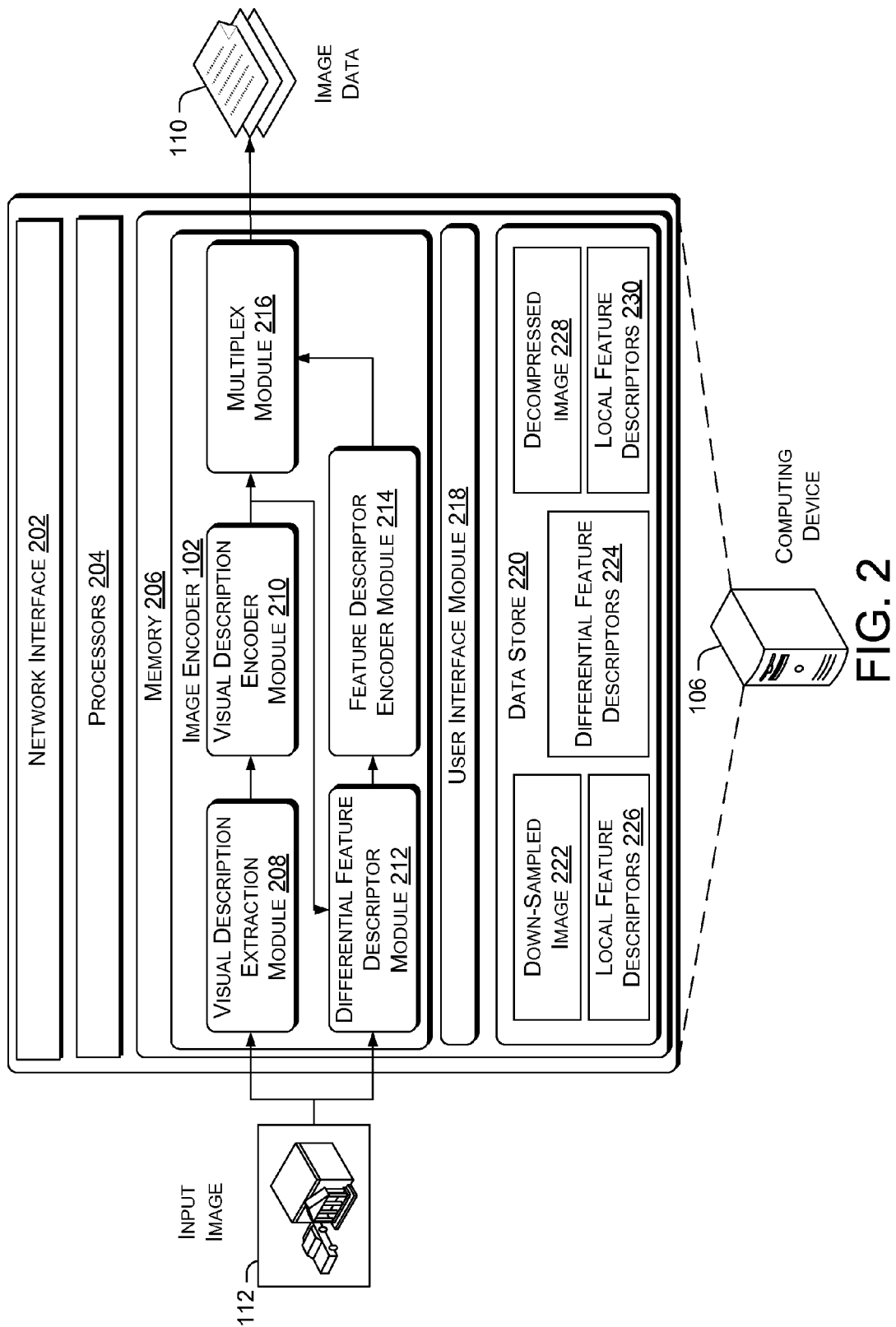
FIG. 2 is an illustrative diagram that shows example components of an image encoder that generates compressed image data from an input image based on local feature descriptors and a visual descriptor of the input image.

FIG. 2 is an illustrative diagram that shows example components of the image encoder 102 that generates compressed image data from an input image based on local feature descriptors and a visual descriptor of the input image. As described above, the image encoder 102 may be implemented by the computing device 106.

The computing device 106 may include a network interface 202, one or more processors 204, memory 206, and/or user controls that enable a user to interact with the router. The network interface 202 may include wireless and/or wireless communication interface components that enable the computing device 106 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct input/output (I/O) interface, such as an Ethernet interface, a serial interface, a Universal Serial Bus (USB) interface, and/or so forth. As such, the computing device 106 may have network capabilities. For example, the computing device 106 may exchange data with other electronic devices (e.g., laptops computers, servers, etc.) via one or more networks, such as the Internet.

The memory 206 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 206 of the computing device 106 may implement the image encoder 102. The image encoder 102 may include a visual description extraction module 208, a visual description encoder module 210, a differential feature descriptor module 212, a feature descriptor encoder module 214, and a multiplex module 216. Additionally, the memory 206 may also store a user interface module 218 and a data store 220.

The visual description extraction module 208 may generate a visual descriptor in the form of a down-sampled image 222. The down-sampled image 222 may carry image information, such as outline, shape, color, and objects information. For example, the generation of the down-sampled image 222 may include filtering of the input image 112, as represented by the following equation:

$$I_g(x,y) = \sum_{n=-T/2}^{T/2} \sum_{m=-T/2}^{T/2} I(x,y) G(x-m, y-n, \sigma) \quad (1)$$

in which G( ) represents a discrete low-pass filter with the support T+1. The kernel of the low-pass filter may be a Gaussian function with variance $\sigma$. Following filtering, the visual description extraction module 208 may generate the down-sampled image from the input image 112 as follows:

$$I_d(x,y) = I_g(rx, ry), r = 2^0, 2^1, \ldots 2^n, \quad (2)$$

in which n may represent an integer. Parameter r may represent the down-sampling ratio at one dimension. In some embodiments, r may be set as 2 or 4. In other embodiments, r may be set as 8 or 16. As such, the down-sample ratio of the down-sampled image may be 64:1 or 256:1 with respect to the input image 112.

The visual description encoder module 210 may compress the down-sampled image 222 to produce the encoded visual descriptor 116. In some embodiments, the down-sampled image 222 may be compressed using High Efficiency Video Coding (HEVC). However, in other embodiments, other lossless or lossy image compression algorithms may be applied to compress the down-sampled image 222, such as Joint Photographic Expert Group (JPEG) or JPEG 200.

The differential feature descriptor module 212 may generate differential feature descriptors 224. In order to do so, the differential feature descriptor module 212 may initially obtain a corresponding set of local feature descriptors for each of the input image 112 and the encoded visual descriptor 116. A set of local feature descriptors may characterize the features around key points that are extracted from a series of smoothed and re-sampled images of an original image. The use of the series of smoothed and re-sampled images may enable basic salient features to become more apparent and fine features to become less apparent with each successive scale level. In at least some embodiments, the local feature descriptors of an image may be SIFT descriptors.

In some embodiments, the differential feature descriptor module 212 may obtain the local feature descriptors of an image by initially generating a Gaussian scale space for the image. The Gaussian scale space for the image may be generated by repeatedly applying the filtering algorithm represented in equation (1) and the down-sampling algorithm represented in equation (2) with a parameter r to the image. The Gaussian scale space generated for an image may include a set of generated images $\{(I_{0,0}, \ldots, I_{0,K}), \ldots, (I_{N,0}, \ldots, I_{N,K})\}$, in which n ($0 \leq n \leq N$) may represent an octave index in the space that indicates that the input image 112 is down-sampled n times. Further, k ($0 \leq k \leq K$) may be a filtering index in an octave, and the visual description extraction module 208 may generate differences of the images in the Gaussian scale spaced by $D_{n,k} = I_{n,k+1} - I_{n,k}$.

Indeed, $D_{n,k}$ may constitute a Laplacian scale-space L(x) with $x = (x, y, s)^T$, in which s may be a scale index and is defined as $s = n + (k-1)/(K-2)$ with $K \geq 3$ and $1 \leq k \leq K-2$. As such, the differential feature descriptor module 212 may detect feature points in the Laplacian scale-space L(x) by the maxima and the minima in $D_{n,k}$. In at least one embodiment, if a sample is the largest or smallest of its first set of predetermined number of neighbors (e.g., eight neighbors) and a second set of predetermined number of neighbors (e.g., nine neighbors), respectively, in $D_{n,k+1}$ and $D_{n,k-1}$, the differential feature descriptor module 212 may consider the sample to be a feature point in the image.

Further, given a vector $x_{f0}$ in which $x_{f0} = (x_{f0}, y_{f0}, s_{f0})^T$, the differential feature descriptor module 212 may derive the sub-pixel and a finer scale index to $x_{f0}$ by fitting a 3D quadratic to L(x). Accordingly, the Taylor expansion of L(x) at $x_{f0}$ may be described as follows:

$$L(x) = L(x_{f0}) + \frac{\partial L^T(x)}{\partial x}\bigg|_{x_{f0}} \Delta x + \frac{1}{2} \Delta x^T \frac{\partial^2 L(x)}{\partial x^2}\bigg|_{x_{f0}} \Delta x \quad (3)$$

in which $\Delta x = x - x_{f0}$. Additionally, the differential feature descriptor module 212 may calculate an accurate extreme point as follows:

$$x_f = x_{f0} + \left(\frac{\partial^2 L(x)}{\partial x^2}\bigg|_{x_{f0}}\right)^{-1} \frac{\partial L^T(x)}{\partial x}\bigg|_{x_{f0}}. \quad (4)$$

in which $x_f$ may be the location and scale index of a local feature descriptor, e.g., a SIFT descriptor. The scale value of the local feature descriptor may be $\sigma_f = 1.6 \times 2^{(s_f - n)}$. Thus, in the Gaussian scale space, assuming that the scale index of $I_{n,k'}$ is the closest one to $s_f$, there may be only a limited number of available $I_{n,k}$.

The differential feature descriptor module 212 may also calculate an orientation $\theta$ of a SIFT descriptor in a region, such as the region of $I_{n,k'}$ around $(x_f, y_f)$. The size of region may be set as $W_o \times W_o$, in which $W_o = 9 \times \sigma_f$. The differential feature descriptor module 212 may calculate the local image gradients $d_x$ and $d_y$ using a centered derivative mask $[-1, 0, 1]$. Further, by partitioning an orientation $\arctan(d_y/d_x)$ evenly into multiple bins, such as 36 bins covering 360 degrees, the differential feature descriptor module 212 may calculate a histogram with 36 bins as follows:

$$\theta(i) = \sum_{(d_x, d_y) \in \Omega_\theta(i)} \omega_\theta(x, y)^2 \sqrt{d_x^2 + d_y^2}, \, 1 \leq i \leq 36 \quad (5)$$

in which $$\Omega_\theta(i) = \left\{(d_x, d_y) \bigg| \frac{\pi(i-1)}{18} \leq \arctan\left(\frac{d_y}{d_x}\right) < \frac{\pi i}{18}\right\},$$

and $\omega_\theta(x,y)$ may represent a weighting factor and is defined as a Gaussian function $\sigma_\theta = 1.5 \sigma_f$ centered at $(x_f, y_f)$. The differential feature descriptor module 212 may normalize the histogram and approximate the histogram to a polynomial function, in which the orientation at the highest peak of the function may be $\theta$. Besides the highest peak, if other peaks exist with a value above a percentage (e.g., 80%) of the highest peak, the differential feature descriptor module 212 may generate multiple SIFT descriptors for these peak orientations with the same location and scale index.

The differential feature descriptor module 212 may also extract a feature vector in a region of $I_{n,k}$ around $(x_f, y_f)$. The size of the region may be set as $W_v \times W_v$, in which $W_v = \sqrt{2} \times B \times 3\sigma_f$. The differential feature descriptor module 212 may first rotate the region to $\theta$, which provides rotation invariance for the SIFT descriptors. The factor $\sqrt{2}$ may provide a complete rectangle region after rotation. In some embodiments, the rectangle region may be further partitioned into uniform sub regions, such as 4×4 sub-regions. In such an instance, B=4 and each sub-region has $9\sigma_f^2$ samples. Additionally, the differential feature descriptor module 212 may evenly partition the gradient orientation into multiple bins, such as 8 bins. Thus, for a sub-region j of such an instance, an 8-dimension vector $v_j$ may be generated by using the following equation:

$$v_j(i) = \sum_{(d_x, d_y) \in \Omega_v(i)} \omega_v(x, y)^2 \sqrt{d_x^2 + d_y^2}, 1 \leq i \leq 8 \quad (6)$$

in which $$\Omega_v(i) = \left\{ (d_x, d_y) \middle| \frac{\pi(i-1)}{4} \leq \arctan\left(\frac{d_y}{d_x}\right) < \frac{\pi i}{4} \right\},$$

and $\omega_v(x,y)$ may represent a weighting factor and is defined as a Gaussian function $\sigma_v = B/2$ centered at $(x_f, y_f)$. Accordingly, by combining all sub-regions (e.g., 16 sub-regions), the differential feature descriptor module 212 may obtain one 128-dimensional vector $v = (v_1, \ldots, v_{16})$ that is further normalized into the feature vector of a SIFT descriptor.

Thus, by performing the techniques described above on the input image 112, the differential feature descriptor module 212 may obtain local feature descriptors 226 for the input image 112. However, in order to obtain local feature descriptors for the encoded visual descriptor 116, the differential feature descriptor module 212 may initially use a visual descriptor decoder component to decompress the visual descriptor 116 into a decompressed image 228. However, any local feature descriptors that are extracted from the decompressed image 228 may not correlate with the local feature descriptors 226 that are directly extracted from the input image 112 at location $(x_f, y_f)$ and scale index $s_f$. Accordingly, the differential feature descriptor module 212 may first up-sample the decompressed image 228 to the same resolution as the input image 112. Subsequently, the differential feature descriptor module 212 may performed the techniques described above on the decompressed image 228 to obtain a set of corresponding local feature descriptors 230 for the up-sampled decompressed image 228.

The differential feature descriptor module 212 may generate the differential feature descriptors by using the feature vectors of the local feature descriptors 230 as the prediction for the local feature descriptors 226. Accordingly, for a local feature descriptor, e.g., SIFT descriptor $S = (x_f, y_f, s_f, \theta, v)$ extracted from the input image 112, the differential feature descriptor module 212 may generate a prediction vector $\bar{v}$ in the scale-space by using location $(x_f, y_f)$, scale $s_f$ and orientation $\theta$. The differential feature descriptor module 212 may evaluate the prediction using the normalized mean square error (MSE) as follows:

$$e = \frac{\sum_{j=1}^{16} \sum_{i=1}^{8} (v_j(i) - \bar{v}_j(i))^2}{\sum_{j=1}^{16} \sum_{i=1}^{8} (v_j(i))^2}. \quad (7)$$

Thus, by implementing the above techniques, the differential feature descriptor module 212 may generate the differential feature descriptors 224. The differential feature descriptors 224 may represent the differences between the local feature descriptors 226 of the encoded and the local feature descriptors 230.

The feature descriptor encoder module 214 may compress at least some of the differential feature descriptors 224 into encoded feature descriptors 118. In various embodiments, the action performed by the feature descriptor encoder module 214 may be dependent on the octaves of the differential feature descriptors 224. For octaves with scale index $s_f \geq \log_2 r$, the feature descriptor encoder module 214 may exclude feature vector v from coding, and instead $\bar{v}$ is designated as the reconstruction. For octaves with scale index $\log_2 r - s_0 \leq s_f < \log_2 r$, in which $s_0$ is a constant and is set as a small integer (e.g., 1 or 2), the residual vector $v - \bar{v}$ may be coded by transformation, quantization, and entropy coding. Since the scale indices are small for the rest of the octaves, retrieved patches may be too small to help image reconstruction, the feature descriptor encoder module 214 may discard the differential feature descriptors associated with these octaves. Although such discards may have a negative impact on search results and reconstructed image quality, they are nevertheless cost-effective.

For those of the differential feature descriptors 224 that are to be compressed, the feature descriptor encoder module 214 may first compress the locations of the differential feature descriptors 224. The number of differential feature descriptors 224 to be compressed may be determined based on the number of locations. Scale indices and orientations may then be respectively compressed in raster scan order. Subsequently, the residual feature vectors are coded and compressed one by one. In at least one embodiment, the feature descriptor encoder module 214 may use a fixed-length lossless compression algorithm to perform the compressions.

Locations may indicate positions at which orientations and feature vectors are calculated. Second, locations may be used to calculate the transformation between retrieved image patches and the input image. Thus, given $\mathcal{L} = \{(x_f(1), y_f(1)), \ldots, (x_f(M), y_f(M))\}$ as the set of all feature descriptor locations, in which M may represent a total number, the feature descriptor encoder module 214 may first generate a binary matrix $B_l$ of the same size as the input image 112, for which each element is defined as:

$$b_l(x, y) = \begin{cases} 1, & \text{if } (x, y) \in \mathcal{L} \\ 0, & \text{if } (x, y) \notin \mathcal{L} \end{cases}. \quad (8)$$

Accordingly, the feature descriptor encoder module 214 may compress the matrix via binary arithmetic coding. For example, for any $b_l(x,y) = 1$, an integer may be used to indicate the number of feature descriptors at (x,y). In various embodiments, the number may be an integer between one and four.

Furthermore, $s_f$ may indicate the region sizes to calculate θ and v, respectively. For every $s_f$, the feature descriptor encoder module 214 may code its octave index n by a first predetermined number of bits (e.g., 3 bits), and quantize $s_f$-n into 16 levels at precision of 1/16 and code by a second predetermined number of bits (e.g., 4 bits). The feature descriptor encoder module 214 may further quantize every θ into 128 levels at precision of 45/16≈3 degrees and code by a third predetermined number of bits (e.g., 7 bits), as θ indicates the rotation invariance of differential feature descriptors 224. Therefore, for a differential feature descriptor, $s_f$ and θ coding may take 14 bits.

In the compression of the residual feature vector, the feature descriptor encoder module 214 may first generate a binary string, in which each bit in the binary string indicates whether a corresponding residual feature vector is zero or not after transform and quantization. This feature descriptor encoder module 214 may also compress the string via binary arithmetic coding. Given a residual feature vector, the differential feature descriptor module 212 may code the residual feature vector as two 8×8 matrices:

$$\begin{cases} B_1 = (\Delta v_1, \ldots, \Delta v_8)^T \\ B_2 = (\Delta v_9, \ldots, \Delta v_{16})^T \end{cases} \quad (9)$$

in which $\Delta v_i = v_i - \bar{v}_i$ may be an 8-dimension row vector, and each matrix may be transformed by a 8×8 discrete cosine transform (DCT). Following quantization, most of coefficients may likely to be zero and non-zero coefficients may likely to be small integers. The differential descriptor encoder 214 may convert the DCT coefficients to a binary matrix and a set of non-zero integers, in which each bit indicates whether one coefficient is zero or not. Subsequently, the differential descriptor encoder 214 may evaluate the DCT transformation to compact signal energy. In this way, the differential descriptor encoder 214 may compress at least some of the differential feature descriptors 224 into encoded feature descriptors 118.

The multiplex module 216 may integrate the encoded visual descriptor 116 and the encoded feature descriptors 118 into the image data 110. In various embodiments, the image data 110 may be a stream of data that is transferrable to other computing devices over the network 114.

The user interface module 218 may enable a user to interact with the modules of the image encoder 102 and applications using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. For example, the user interface module 218 may enable the user to select input images to be encoded by the image encoder 102 or create the input images to be encoded by the image encoder 102.

In alternative embodiments, the functions that are performed by one or more modules that are stored in the memory 306 may be implemented in hardware rather than as software instructions. For example, one or more fixed hardware logic circuits may implement the functions performed by the one or more modules stored in the memory 306.

The data store 220 may store the inputs to the image encoder 102, intermediate products, and/or end products that are generated by the image encoder 102. These entities may include the input image 112, the down-sampled image 222, the differential feature descriptors 224, the local feature descriptors 226, the decompressed image 228, the local feature descriptors 230, and/or the image data 110. The data store 220 may also store data for other applications, such as a photo editing software that is implemented on the computing device 106.

Figure 3:
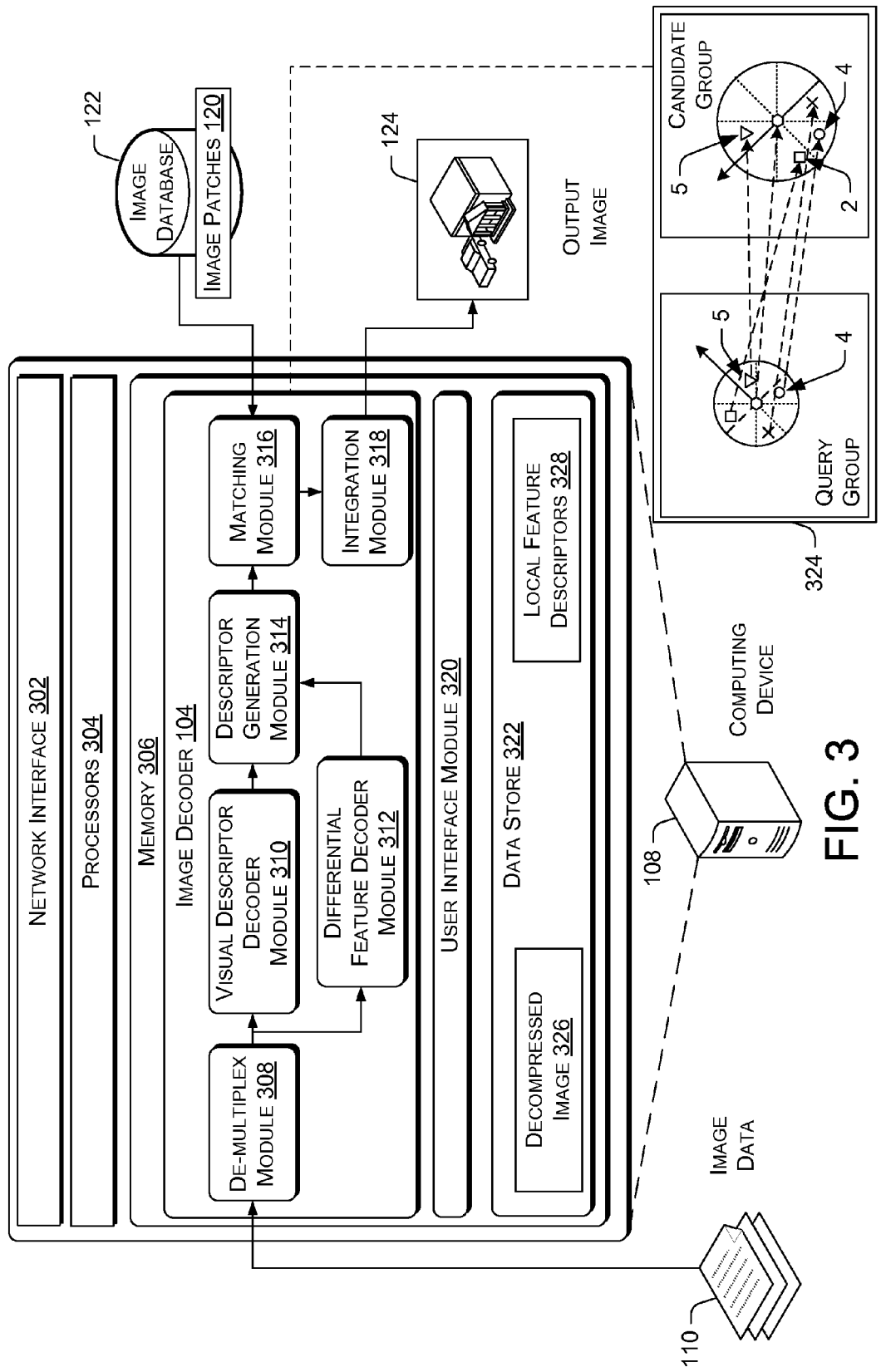
FIG. 3 is an illustrative diagram that shows example components of an image decoder that generates an output image from compressed image data and an image database of image patches.

FIG. 3 is an illustrative diagram that shows example components of an image decoder 104 that generates an output image from compressed image data and an image database of image patches. As described above, the image decoder 104 may be implemented by the computing device 108.

The image decoder 104 may interact with an image database 122 that stores a database of images. The images in the image database 122 may be categorized according to local feature descriptors. For example, a local feature encoder may have been used to generate millions of local feature descriptors that describe aspects of the images in the image library 122. In various embodiments, the local feature descriptors may be trained into a predetermined number of visual words by an approximate k-means algorithm. The visual words in the image database 122 may be further organized into k-d trees to facilitate nearest neighbor searching. As such, a visual word v may be assigned to each local feature V of all images in the image database 122 according to the nearest Euclidian distance. Additionally, the visual words of the images in the image database 122 may be organized into groups accordingly to overlap between the visual words.

As shown with respect to the candidate groups in example 324, "1" in the origin may be the central local feature descriptor. The region of this local feature descriptor may completely cover the regions of member local feature descriptors {"2", . . . , "5"}. In at least one embodiment, if the number of member local feature descriptors is more than 3, the member local feature descriptors may be bundled as a group. However, this bundling is not based on additional detection of stable regions. Furthermore, a polar coordinate system may be used for one-dimensional geometric modeling. As further shown in the example 324, the polar axis may align with the orientation of the central local feature descriptor. The polar plane may be partitioned into R sectors ordered counterclockwise. A sector index r may be assigned to each member local feature descriptor in the group. Accordingly, such a geometric verification may allow for rotation invariance. Therefore, the local feature descriptors in the image database 122 may be extended as $S=\{x_f,s,\theta,v,r,V\}$ by adding visual word v and sector index r.

The computing device 108 may include a network interface 302, one or more processors 304, memory 306, and/or user controls that enable a user to interact with the router. The network interface 302 may include wireless and/or wireless communication interface components that enable the computing device 108 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct I/O interface, such as an Ethernet interface, a serial interface, a Universal Serial Bus (USB) interface, and/or so forth. As such, the computing device 106 may have network capabilities. For example, the computing device 106 may exchange data with other electronic devices (e.g., laptops computers, servers, etc.) via one or more networks, such as the Internet.

The memory 306 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 306 of the computing device 108 may implement the image decoder 104. The image decoder 104 may include a de-multiplex module 308, a visual descriptor decoder module 310, a differential feature decoder module 312, a descriptor generation module 314, a matching module 316, and an integration module 318. Additionally, the memory 306 may also store a user interface module 320 and a data store 322.

The de-multiplex module 308 may receive the image data 110 via the network interface 302. In turn, the de-multiplex module 308 may parse the encoded visual descriptor 116 and the encoded feature descriptors 118 from the image data 110. The visual descriptor decoder module 310 may decompress the encoded visual descriptor 116 to produce a decompressed image 326, which is the reconstructed visual descriptor $\tilde{I}^v$. For example, the encoded visual descriptor 116 may be decompressed using JPEG, JPEG 200, or HEVC, depending on the original compression algorithm.

The differential feature decoder module 312 may decompress the encoded feature descriptors 118 to recreate the differential feature descriptors 224. In various embodiments, the decompression may be achieved using an inverse of the techniques implemented by the feature descriptor encoder module 214. Accordingly, the differential feature decoder module 312 may produce the differential feature descriptors $\tilde{Z}_{f^d}$.

The descriptor generation module 314 may generate reconstructed local feature descriptors 328 from the reconstructed visual descriptor $\tilde{I}^v$ and differential feature descriptors $\tilde{Z}_{f^d}$. The reconstructed visual descriptor $\tilde{I}^v$ may be initially up-sampled by the descriptor generation module 314 to the original resolution of the input image 112. In at least one embodiment, the up-sampling may be accomplished using a convolution with Lanczos kernel L as follows:

$$\tilde{I}^u(x,y,k)=L(x,y,k)*\tilde{I}^v(x,y) \quad (10)$$

in which k is the up-sample ratio. The resulting image $\tilde{I}^u$ may be used by the descriptor generation module 314 to generate the vectors $\{v_i\}$ based on the decoded $\tilde{Z}_{f^d}$, producing the set of approximated local feature descriptors $\tilde{Z}_{f^d}$ as follows:

$$\tilde{Z}_{f^d}=\Psi(\tilde{I}^u|\check{Z}_{f^d}) \quad (11)$$

In other words, the descriptor generation module 314 may extract the local feature descriptors while taking into consideration the scale and orientation information at the key point positions denoted by $\check{Z}_{f^d}$. Accordingly, the two sets, $\tilde{Z}_{f^d}$ and $\tilde{Z}_{f^v}$, may form the set of local feature descriptors $\tilde{Z}_f$, which are the reconstructed local feature descriptors 328, as follows:

$$\tilde{Z}_f=\tilde{Z}_{f^d}\cup\tilde{Z}_{f^v} \quad (12).$$

The matching module 316 may retrieve correlated image patches 120 from the image database 122 for reconstructing an image by performing visual word-based matching. In order to do so, the matching module 316 may quantize the local feature descriptors 226 into visual words. In various embodiments, the matching module 316 may use an approximate k-means algorithm to training the local feature descriptors 226 into the visual words. The matching module 316 may then compare the visual words from the local feature descriptors 226 to the visual words that correspond to the images in the image database 122. As shown in example 324, $G_p=\{S_p(i)\}$ on the left side is a query group of visual words that may match a candidate group of visual words $G_q=\{S_q(j)\}$ on the right side that corresponds to an image in the image database 122. In such a scenario, the matching may be scored as follows:

$$E_m(G_p,G_q)=E_v(G_p,G_q)-E_r(G_p,G_q). \quad (13)$$

in which $E_v(G_p,G_q)$ may be the number of matched visual words between two groups. According to the one-dimensional geometric model in the polar coordinate system, matched visual words are to have the same sector index. Thus, since $E_r(G_p,G_q)$ is the number of matched visual words but with different sector indices, the matching module 316 may subtract that number from $E_v(G_p,G_q)$.

The matching module 316 may use an inverted-file index to find groups of visual words that match. In various embodiments, each visual word may have an entry in an index that contains the list of images in which the visual word appears. Because a group of visual words are used, there may be multiple members in each group. In various embodiments, the number of member visual words in a group may be limited to 128. Further, the number of sectors in the one-dimensional geometric model may be set between 4 and 8.

In the example 324, the matching module 316 may first use the central visual word "1" in the query group find groups with the same central visual word in the inverted-file index, and every candidate group may be scored. As shown in the example 324, there may be four pairs of matching member visual words. Thus, $E_v(G_p,G_q)$ may have the value of "5" after counting the central visual word. But the visual word "4" has sector index 6 and 3 in the two groups, respectively. Because of this inconsistency, $E_r(G_p,G_q)$ may be equal to "1". Thus, the matching module 316 may calculate the matching score $E_m(G_p,G_q)$ of the two groups as "4". This score may be assigned to the image in the image database 122 that contains the candidate group. After all query groups are matched, the matching module 316 may select multiple images with one or more high sum scores as partial duplicate images.

The matching module 316 may further perform image patch retrieval based on the selected partial duplicate images. Since the number of images is limited, every query local feature descriptor may be directly matched with those on the partial duplicate images. Accordingly, the matching module 316 may fully utilize the discriminative power of the local feature descriptors. For example, for a query descriptor S, if the Euclidean distance of the closest neighbor is smaller than ⅔ distance of the second-closest neighbor, the closest neighbor may be considered a correct match to the query descriptor S.

Further, for a pair of matched descriptors $\tilde{S}$ and S, the matching module 316 may find two image patches $P_{\tilde{S}}$ and $P_S$ in an up-sampled visual descriptor $\tilde{I}_u$ and an image that contains S according to their respective locations, scales and orientations. In some instances, it may be difficult to estimate the transformation between them by matching corresponding pixels because $P_{\tilde{S}}$ may be too blurred. In such instance, the matching module 316 may use the locations of query local feature descriptors as extracted from an original image.

In various embodiments, the matching module 316 may find local feature descriptors located in the patches $P_{\tilde{S}}$ and $P_S$. The correspondences may be established by matching every local feature descriptor in $P_{\tilde{S}}$ with those in $P_S$. The matching module 316 may further use the locations of the matched pairs of local feature descriptors to estimate the transformation H between $P_{\tilde{S}}$ and $P_S$ by using the Random Sample Consensus (RANSAC) algorithm. In at least one embodiment, a designated pairs of locations (e.g., four pairs) may be randomly selected to calculate H. The rest of the pairs of locations may be used to verify H. If a pair of locations fits with H, the matching module 316 may count the pair as an inlier, otherwise it is an outlier. In this way, the matching module 316 may obtain H with the maximum number of inliers.

In scenarios in which the scales of local feature descriptors 328 are small, the retrieved patches may also be small. For example, the pairs of matched descriptors may be less than four. In this example, the matching module 316 may directly write the transformation H from the locations, scales and orientations of $\tilde{S}$ and S. As such, H between $P_{\tilde{S}}$ and $P_S$ may be assumed to be a combination of translation, rotation and scaling, as follows:

$$H = \begin{bmatrix} \frac{\tilde{s}}{s} R & T \end{bmatrix}, \quad (14)$$

$$R = \begin{bmatrix} \cos(\tilde{\theta}-\theta) & -\sin(\tilde{\theta}-\theta) \\ \sin(\tilde{\theta}-\theta) & \cos(\tilde{\theta}-\theta) \end{bmatrix}, T = \begin{bmatrix} \tilde{x}_f - x_f \\ \tilde{y}_f - y_f \end{bmatrix} \quad (15)$$

In this way, the matching module 316 may retrieve correlated image patches 120 from the image database 122 for reconstructing an image, such as the input image 112, by performing visual word-based matching.

In some instances, the image patches 120 that are retrieved by the matching module 316 for reconstructing an image may be directly sent to the integration module 318 for stitching into the image. However, in other instances, the matching module 316 may detect that one or more of the image patches 120 include partial content that do not exist in the image to be reconstructed. Accordingly, the matching module 316 may segment and remove such partial content prior to stitching.

In various embodiments, the matching module 316 may perform graph-based segmentation to detect the extraneous partial content for removal. The matching module 316 may model an image patch $\hat{P}_S$ as an undirected graph G=(V,E), in which a vertex $v_i \in V$ corresponds to a pixel and an edge $(v_i, v_j) \in E$ connects a pair of neighboring vertices $v_i, v_j \in V$. Each edge may be associated with a non-negative weight $w(v_i, v_j)$ to measure the dissimilarity between two vertices. For two neighboring regions C1, C2 $\subseteq$ V, the largest weights within these two regions may be denoted as $w_{C1}$ and $w_{C2}$, respectively. The minimum weight of the boundary between C1 and C2 may be denoted as $W_{C1,C2}$. The matching module 316 may perform a segmentation between C1 and C2 as follows:

$$\mathcal{F}(C1, C2) = \begin{cases} \text{True} & \text{if } w_{C1,C2} > \min(w_{C1}+\tau_{C1}, w_{C2}+\tau_{C2}) \\ \text{False} & \text{otherwise} \end{cases} \quad (16)$$

in which $\tau_{C1}$ and $\tau_{C2}$ may be inversely proportional to the number pixels in C1 and C2, as these values control the over-segmentation. Following segmentation, the matching module 316 may verify every region by using the up-sampled visual descriptor $\tilde{I}_u$. The matching module 316 may calculate the mean square error (MSE) of every region with regard to the corresponding region in $\tilde{I}_u$. Thus, if the MSE value of a region is larger than a threshold, the matching module 316 may remove the region, which contains extraneous partial content, from the image patch. The removed region does not pose a problem as the removed region may be recovered from other retrieved patches.

The integration module 318 may stitch image patches 120 that are retrieved for reconstructing an image together to form the image, such as the output image 124. In various embodiments, the integration module 318 may stitch the image patches 120 in increasing order according to their MSE values with respect to the down-sampled image 222. For example, after the removal of inconsistent regions, the integration module 318 may stitch the image patch $\tilde{P}_S$ to other image patches. In some instances, since $\tilde{P}_S$ may be from an image with different illumination than one or more other image patches, directly stitching it to the up-sampled image $\tilde{I}_u$ will result in block artifacts.

Thus, instead of directly stitching $\tilde{P}_S$, the integration module 318 may apply a gradient field g to $\tilde{P}_S$ in order to interpolate the corresponding image patch f in $\tilde{I}_u$. This operation may formulated as the following minimization problem:

$$\min_f \iint_\Omega |\nabla f - g|^2, \text{ with } \tilde{I}_u|_{\partial\Omega} = f|_{\partial\Omega}. \quad (17)$$

in which $\Omega$ may be the region of $\tilde{P}_S$ to stitch, an may be the boundary of $\overline{P}_S$ in $\tilde{I}_u$, and $\nabla$ is the gradient operator. The solution to equation (17) may be the unique solution of the Poisson equation with Dirichlet boundary conditions, as follows:

$$\Delta f = \text{div } g \text{ over } \Omega, \text{ with } \tilde{I}_u|_{\partial\Omega} = f|_{\partial\Omega}. \quad (18)$$

in which $\Delta$ may be the Laplacian operator, and div g may be the divergence of g. Solving Poisson equation (18) is an intensive computing process. However, solving the Poisson equation is equivalent to solving the following Laplace equation:

$$\Delta \tilde{f} = 0 \text{ over } \Omega \text{ with } (\tilde{I}_u - \tilde{P}_S)|_{\partial\Omega} = \tilde{f}|_{\partial\Omega}. \quad (19)$$

in which the image patch to stitch is $f = \tilde{P}_S + \tilde{f}$.

Nevertheless, instead of solving either the Poisson equation (18) or the Laplace equation (19), the integration module 318 may in some instances adopt the membrane interpolation method, in which $\tilde{f}$ is approximated by smoothly spreading the discrepancies along the boundary to the entire region $\Omega$. Accordingly, the interpolation value $\tilde{f}$ may be written as:

$$\tilde{f} = (G * \tilde{r})/(G * \tilde{R}), \quad (20)$$

$$\text{where } \tilde{r}(x_i) = \begin{cases} \tilde{I}_u(x_i) - \tilde{P}_S(x_i), & \forall x_i \ni \partial\Omega \\ 0, & \text{otherwise} \end{cases}.$$

in which * may represent the convolution, $\tilde{R}(x_i)$ is 1 if $\tilde{r}(x_i)$ is non-zero; otherwise 0. Further, $G(x_i, x_j)$ may be the translation-invariant Green's functions in two dimensions as:

$$G(x_i, x_j) = G(\|x_i - x_j\|) = 2\pi \log \frac{1}{\|x_i - x_j\|}. \quad (21)$$

In which $x_i$ and $x_j$ may represent two points in two dimensions, and the function value may be only dependent on the distance between $x_i$ and $x_j$. Furthermore, the integration module 318 may calculate the convolution in equation (20) with three short-support filters in a multi-scale scheme similar to wavelet transform, and the computation has linear time O(n) to the number of pixels. Thus, by performing the techniques described above, the integration module 318 may stitch image patches 120 that are retrieved for reconstructing an image together to form the image.

The user interface module 320 may enable a user to interact with the modules of the image decoder 104 and other applications using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. For example, the user interface module 320 may enable the user to select input images to be encoded by the image encoder 102 or create the input images to be encoded by the image encoder 102.

In alternative embodiments, the functions that are performed by one or more modules that are stored in the memory 306 may be implemented in hardware rather than as software instructions. For example, one or more fixed hardware logic circuits may implement the functions performed by the one or more modules stored in the memory 306.

The data store 322 may store the inputs to the image decoder 104, intermediate products, and/or end products that are generated by the image decoder 104. These entities may include the image data 110, the decompressed image 326, and/or the reconstructed local feature descriptors 328. The data store 322 may also store data for other applications, such as an image viewing software, a web browser, a word processing application, etc., that is implemented on the computing device 106.

In some embodiments, the tasks performed by the image decoder 104 may be implemented in parallel or partially in parallel by multiple computing devices, rather than as performed by a single computing device 108. For example, functions as such image patch retrieval and image patch segmentation may be implemented in parallel or partially in parallel by multiple devices. Further, the matching of image patches in the image database 122 to local feature descriptors in the image data 110 may be performed in parallel using multiple computing devices.

Example Processes

FIGS. 4-8 describe various example processes for using local feature descriptors of an image to generate compressed image data, and reconstruct the image using image patches that are external to the image based on the compressed image data. The order in which the operations are described in each example process is not intended to be construed as a limitation, and any number of the described operations may be combined in any order and/or in parallel to implement each process. Moreover, the operations in each of the FIGS. 4-8 may be implemented in hardware, software, and a combination thereof. In the context of software, the operations may represent computer-executable instructions that, when executed by one or more processors, cause one or more processors to perform the recited operations. The one or more processors may be included in individual computing devices or included in multiple computing devices that are part of a cloud. Generally, computer-executable instructions include routines, programs, objects, components, data structures, and so forth that cause the particular functions to be performed or particular abstract data types to be implemented. In other embodiments, the operations of each example process may be executed by a hardware logic circuit, such as a dedicated integrated circuit.

Figure 4:
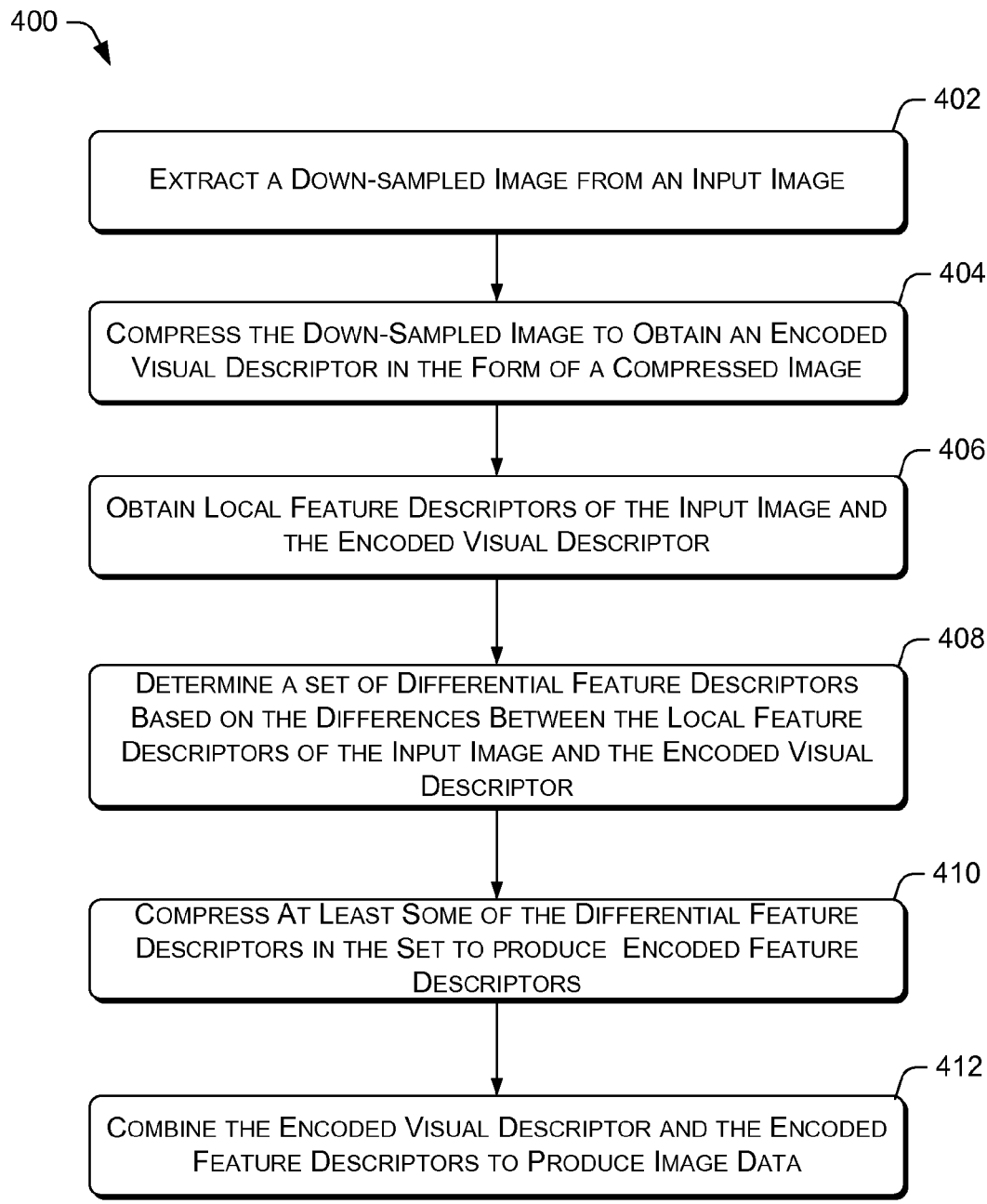
FIG. 4 is a flow diagram that illustrates an example process for generating compressed image data from an input image based on local feature descriptors and a visual descriptor of the input image.

FIG. 4 is a flow diagram that illustrates an example process 400 for generating compressed image data from an input image based on local feature descriptors and a visual descriptor of the input image.

At block 402, the image encoder 102 may extract a visual descriptor in the form of a down-sampled image 222 from an input image 112. The down-sampled image 222 may include key feature descriptors that carry image information, such as outline, shape, color, and objects information.

At block 404, the image encoder 102 may compress the down-sampled image 222 into the encoded visual descriptor 116. In some embodiments, the down-sampled image 222 may be compressed using (HEVC). However, in other embodiments, additional lossless or lossy image compression algorithms may be applied to compress the down-sampled image 222, such as JPEG or JPEG 2000.

At block 406, the image encoder 102 may obtain local feature descriptors of the input image 112 and the encoded visual descriptor 116. In various embodiments, each set of local feature descriptors may be extracted by developing a series of smoothed and re-sampled images of a starting image. The use of the series of smoothed and re-sampled images may enable basic salient features to become more apparent and the fine features to become less apparent with each successive scale level. In at least some embodiments, each set of the local feature descriptors may include SIFT descriptors.

At block 408, the image encoder 102 may determine a set of differential feature descriptors 224 based on the differences between the local feature descriptors of the input image and the local feature descriptors of the encoded visual descriptor 116. At block 410, the image encoder 102 may compress at least some of the differential feature descriptors in the set to produce the encoded feature descriptors 118. For example, the image encoder 102 may compress the entire set of encoded feature descriptors or exclude one or more encoded feature descriptors from the set before performing the compression.

At block 412, the image encoder 102 may combine the encoded visual descriptor 116 and the encoded feature descriptors 118 to produce image data 110. In various embodiments, the image data 110 may be a stream of data that is transferrable to other computing devices over the network 114.

Figure 5:
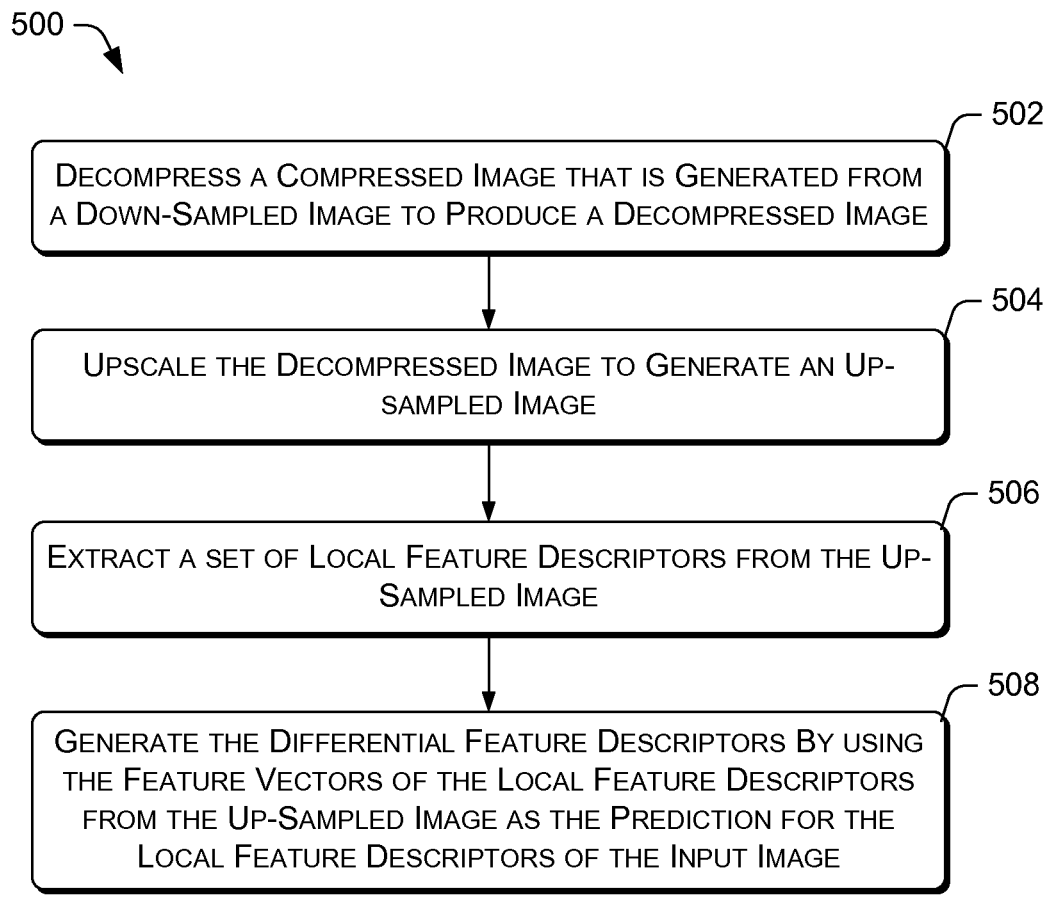
FIG. 5 is a flow diagram that illustrates an example process for producing differential feature descriptors that form the compressed image data.

FIG. 5 is a flow diagram that illustrates an example process 500 for producing differential feature descriptors that form the compressed image data. The example process 500 may further describe block 408 of the example process 400.

At block 502, the image encoder 102 may decompress the encoded visual descriptor 116. In various embodiments, the decompression may be performed using a JPEG, JPEG 2000, HEVC, or another decompression algorithm. The decompression by the image encoder 102 may generate the decompressed image 228.

At block 504, the image encoder 102 may upscale the decompressed image 228 into an up-sampled image. In this way, the local feature descriptors 230 that are eventually produced from the decompressed image 228 may correlate in scale with the local feature descriptors 226 that are produced from the input image 112.

At block 506, the image encoder 102 may extract the local feature descriptors 230 from the up-sampled image. In various embodiments, the local feature descriptors 230 may be extracted by at least generating a Gaussian scale space for the up-sampled image, and then identify feature vectors of the up-sampled image in the Gaussian scale space.

At block 508, the image encoder 102 may generate the differential feature descriptors 224 by using the feature vectors of the local feature descriptors 230 from the up-sampled image as the prediction for the local feature descriptors 226. In various embodiments, the differential feature descriptors may be obtained by evaluating the prediction using the normalized mean square error (MSE).

Figure 6:
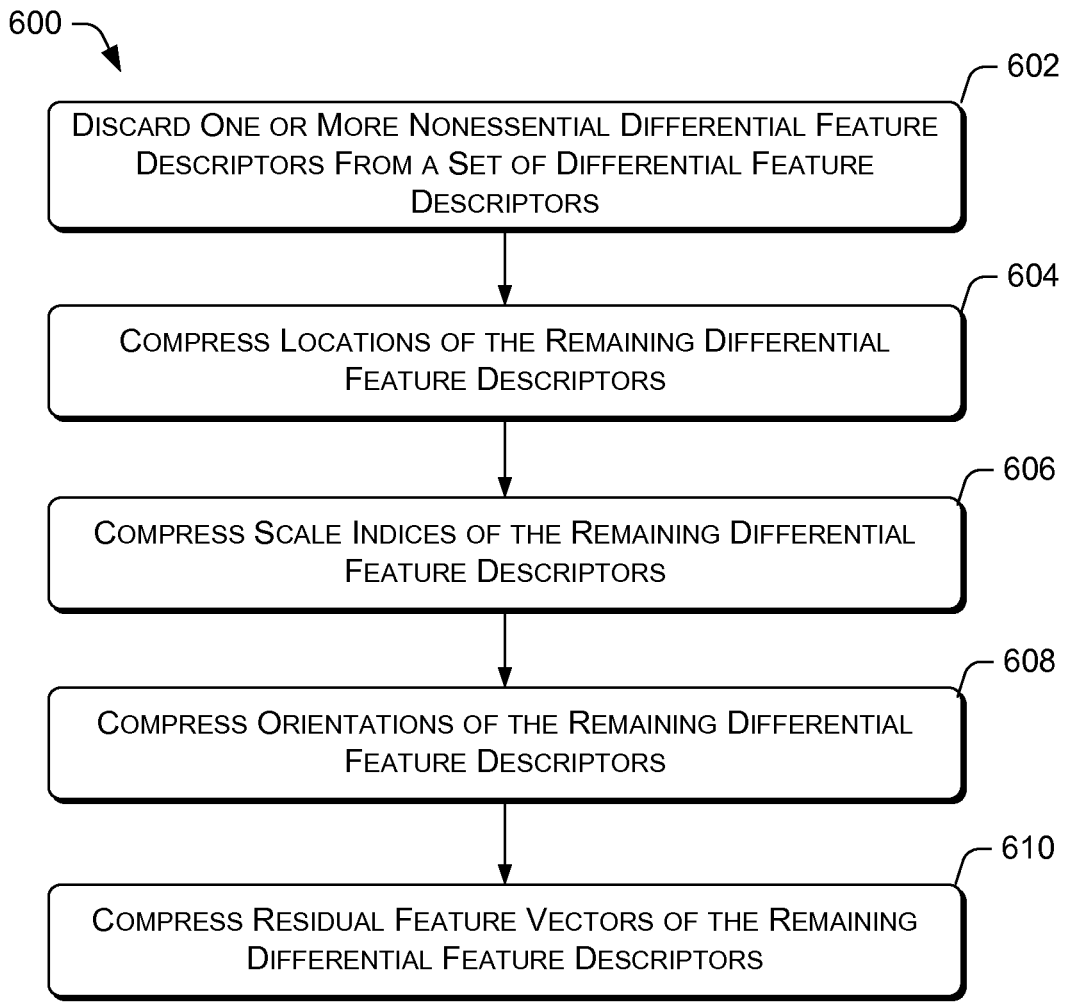
FIG. 6 is a flow diagram that illustrates an example process for compressing the differential feature descriptors for encoding into the compressed image data.

FIG. 6 is a flow diagram that illustrates an example process 600 for compressing the differential feature descriptors for encoding into the compressed image data. The example process 600 may further describe block 410 of the example process 400.

At block 602, the image encoder 102 may discard one or more nonessential differential feature descriptor from the set of differential feature descriptors 224. In some embodiments, the image encoder 102 may discard one or more differential feature descriptors when their octaves are below a predetermined threshold, as such differential feature descriptors are unlikely to result in the retrieval of relevant image patches for image reconstruction.

At block 604, the image encoder 102 may compress locations of the remaining differential feature descriptors 224. In various embodiments, locations may indicate positions in an image at which orientations and feature vectors are calculated. At block 606, the image encoder 102 may compress scale indices in the remaining differential feature descriptors 224. At block 608, the image encoder 102 may compress orientations of the remaining differential feature descriptors 224. In at least one embodiment, the scale indices and the orientations may be respectively compressed in raster scan order.

At block 610, the image encoder 102 may compress residual feature vectors of the remaining differential feature descriptors 224. In various embodiments, the feature descriptor encoder module 214 may use a fixed-length lossless compression algorithm to perform the compressions.

Figure 7:
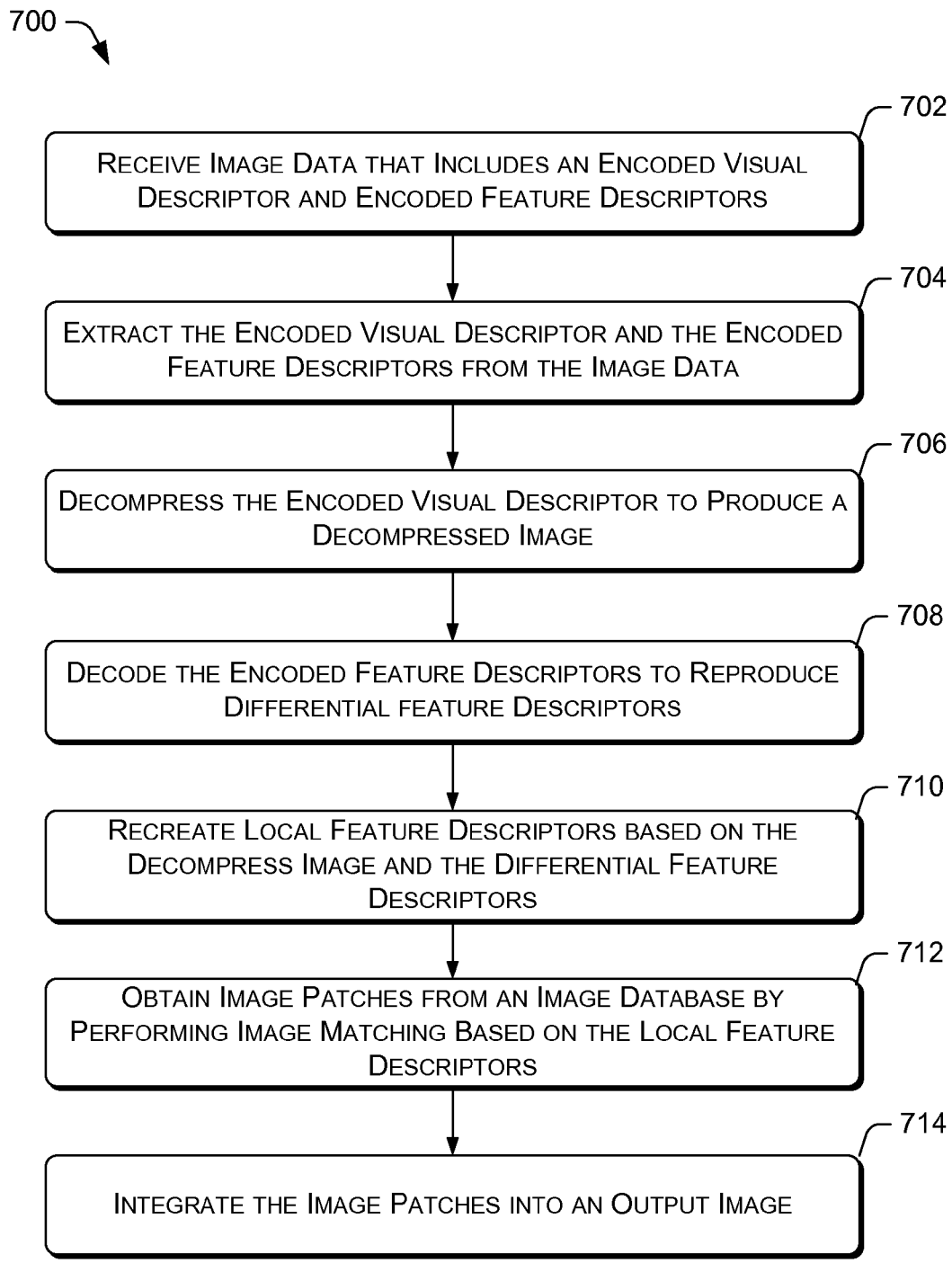
FIG. 7 is a flow diagram that illustrates an example process for reconstructing an image based on compressed image data and image patches from an image database.

FIG. 7 is a flow diagram that illustrates an example process 700 for reconstructing an image based on compressed image data and image patches from an image database.

At block 702, the image decoder 104 may receive image data 110 that includes an encoded visual descriptor 116 and encoded feature descriptors 118. In at least one embodiment, the image decoder 104 may receive the image data 110 from the computing device 106 via the network 114.

At block 704, the image decoder 104 may extract the encoded visual descriptor 116 and the encoded feature descriptors 118 from the image data 110. In various embodiments, the extraction may be performed via a de-multiplexer component of the image decoder 104.

At block 706, the image decoder 104 may decompress the encoded visual descriptor to produce the decompressed image 326. In various embodiments, the encoded visual descriptor 116 may be decompressed using JPEG, JPEG 2000, or HEVC, depending on the original compression algorithm.

At block 708, the image decoder 104 may decompress the encoded feature descriptors 118 to reproduce the differential feature descriptors 224. In various embodiments, the decompression of the encoded feature descriptors 118 may be achieved using an inverse of the techniques implemented by the image encoder 102.

At block 710, the image decoder 104 may reconstruct the local feature descriptors 328 based on the decompressed image 326 and the differential feature descriptors 224. In various embodiments, the reconstruction may include up-sampling the decompressed image 326 to the resolution of the input image 112, and then obtain the local feature descriptors 328 while taking into consideration the scale and orientation information at the key point positions in the decompressed image 326.

At block 712, the image decoder 104 may obtain image patches from the image database 122 by performing image matching based on the local feature descriptors. In various embodiments, the image decoder 104 may derive visual words from the local feature descriptors, and compare such visual words to visual words that describe image patches in the image database 122 to obtain the matching image patches 120.

At block 714, the image decoder 104 may integrate the image patches 120 into the output image 124 that visually resembles the input image 112. For example, the output image 124 and the input image 112 may have little or no visually perceptible differences in appearance. In various embodiments, the image patches 120 may be stitched together in increasing order according to their MSE values with respect to the down-sampled image 222.

Figure 8:
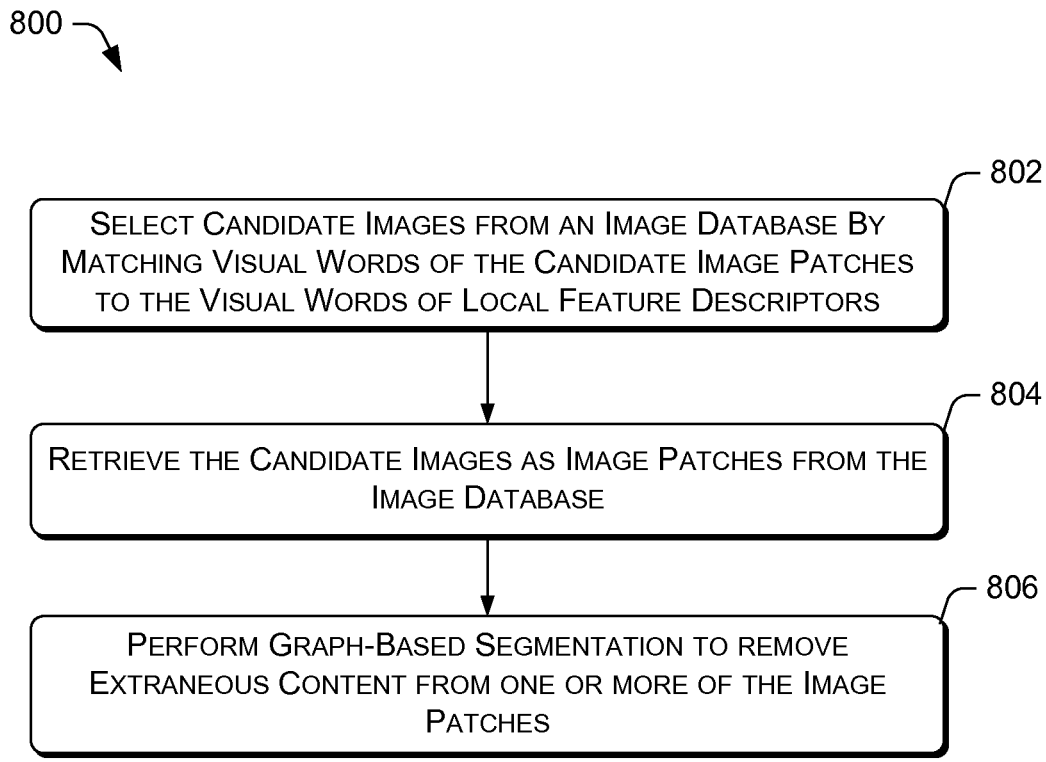
FIG. 8 is a flow diagram that illustrates an example process for integrating candidate image patches selected from an image database into an image.

FIG. 8 is a flow diagram that illustrates an example process 800 for integrating candidate image patches selected from an image database into an image. The example process 800 may further describe block 712 of the example process 700.

At block 802, the image decoder 104 may select candidate images from an image database 122 by matching visual words that describe the candidate image patches to the visual words that describe the local feature descriptors 328. The local feature descriptors 328 are derived from the image data 110. In various embodiments, the image decoder 104 may use an approximate k-means algorithm to training the local feature descriptors 226 into the visual words, and further use an inverted-file index to find groups of visual words that match.

At block 804, the image decoder 104 may retrieve the candidate images as image patches from the image database 122. The image database 122 may include image patches that are stored in one or more cloud servers. Alternatively or concurrently, the image database 122 may include image patches that are stored on a computing device, such as the computing device 106 or the computing device 108.

At block 806, the image encoder may perform graph-based segmentation to remove extraneous content from one or more of the image patches. Extraneous content may be inconsistent content in an image patch that is determined to produce block artifacts in the output image 124.

The techniques described herein make use of visual correlation among multiple images to compress and reconstruct an image. Accordingly, such techniques may reduce the amount of visual redundancy and provide efficient compression of images without resorting to the increased computational complexity associated with current image compression schemes.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. One or more computer-readable storage media storing computer-executable instructions that are executable to cause one or more processors to perform acts comprising:
   compressing a down-sampled image of an input image to obtain an encoded visual descriptor of the input image;
   obtaining local feature descriptors of the input image and the encoded visual descriptor; and
   determining differential feature descriptors based on differences between the local feature descriptors of the input image and the encoded visual descriptor.

2. The one or more computer-readable storage media of claim 1, further comprising downscaling the input image into the down-sampled image that includes key feature descriptor information of the input image.

3. The one or more computer-readable storage media of claim 1, further comprising:
   compressing at least some of the differential feature descriptors to produce encoded feature descriptors;
   combining the encoded visual descriptor and the encoded feature descriptors to produce image data;
   extracting the encoded feature descriptors and the encoded visual descriptor from the image data;
   decompressing the encoded visual descriptor to produce a decompressed image;
   decoding the encoded feature descriptors to reproduce the differential feature descriptors;
   recreating the local feature descriptors based on the decompressed image and the differential feature descriptors;
   obtain image patches from an image database by performing image matching based on the local feature descriptors; and
   integrating the image patches into in an output image that visually resembles the input image.

4. The one or more computer-readable storage media of claim 3, further comprising performing graph-based segmentation to remove extraneous content from one or more of the image patches.

5. The one or more computer-readable storage media of claim 3, wherein the compressing at least some of the differential feature descriptors includes:
   compressing locations of a set of differential feature descriptors;
   compressing scale indices of the set of differential feature descriptors in a raster scan order;
   compressing orientations of the set of differential feature descriptors in the raster scan order; and
   compressing residual feature vectors of the set of differential feature descriptors.

6. The one or more computer-readable storage media of claim 5, wherein the compressing at least some of the differential feature descriptors further includes excluding a differential feature descriptor from the set of differential feature descriptors prior to the compressing based on an octave of the differential feature descriptor.

7. The one or more computer-readable storage media of claim 3, wherein the obtaining the image patches from the image database includes:
   selecting candidate images from the image database by matching visual words that describe the candidate images to the visual words that describe the local feature descriptors; and
   retrieving the candidate images as image patches from the image database.

8. The one or more computer-readable storage media of claim 1, wherein the obtaining includes extracting the local feature descriptors by at least generating a Gaussian scale space for the input image, and then identifying feature vectors of the input image in the Gaussian scale space.

9. The one or more computer-readable storage media of claim 1, wherein the determining the different feature descriptors includes:
   decompressing the encoded visual descriptor to produce a decompressed image;
   upscaling the decompressed image to generate an up-sampled image;
   extracting additional local feature descriptors from the up-sampled image; and
   generating the differential feature descriptors by setting feature vectors of the additional local feature descriptors from the up-sampled image as prediction for the local feature descriptors of the input image, and evaluating the prediction using a normalized mean square error.

10. The one or more computer-readable storage media of claim 1, wherein the local feature descriptors include Scale Invariant Feature Transform (SIFT) descriptors or Speeded Up Robust Feature (SURF) descriptors.

11. A computer-implemented method, comprising:
   downscaling an input image into a down-sampled image that includes key feature descriptor information of the input image;
   compressing the down-sampled image to obtain an encoded visual descriptor of the input image;
   obtaining local feature descriptors of the input image and the encoded visual descriptor;
   determining differential feature descriptors based on differences between the local feature descriptors of the input image and the encoded visual descriptor;
   compressing at least some of the differential feature descriptors to produce encoded feature descriptors; and
   combining the encoded visual descriptor and the encoded feature descriptors to produce image data.

12. The computer-implemented method of claim 11, wherein the obtaining includes extracting the local feature descriptors by at least generating a Gaussian scale space for input image, and then identifying feature vectors of the input image in the Gaussian scale space.

13. The computer-implemented method of claim 11, wherein the determining the different feature descriptors includes:
   decompressing the encoded visual descriptor to produce a decompressed image;
   upscaling the decompressed image to generate an up-sampled image;
   extracting additional local feature descriptors from the up-sampled image; and
   generating the differential feature descriptors by setting feature vectors of the additional local feature descriptors from the up-sampled image as prediction for the local feature descriptors of the input image, and evaluating the prediction using a normalized mean square error.

14. The computer-implemented method of claim 11, wherein the compressing at least some of the differential feature descriptors includes:
   compressing locations of a set of differential feature descriptors;
   compressing scale indices of the set of differential feature descriptors in a raster scan order;

compressing orientations of the set of differential feature descriptors in the raster scan order; and compressing residual feature vectors of the set of differential feature descriptors.

15. The computer-implemented method of claim 14, wherein the compressing at least some of the differential feature descriptors further includes excluding a differential feature descriptor from the set of differential feature descriptors prior to the compressing based on an octave of the differential feature descriptor.

16. The computer-implemented method of claim 11, wherein the local feature descriptors include Scale Invariant Feature Transform (SIFT) descriptors or Speeded Up Robust Feature (SURF) descriptors.

17. A system, comprising:
one or more processors;
a memory that includes a plurality of computer-executable components that are executable by the one or more processors, comprising:
 a visual descriptor decoder component that decompresses an encoded visual descriptor included in input image data to produce a decompressed image, the input image data being derived from an original image;
 a differential feature decoder component that decodes encoded feature descriptors included in the input image data to reproduce differential feature descriptors; and
 a descriptor generator component that up-samples the decompressed image to a higher resolution and generates local feature descriptors based on the up-sampled decompressed image and the differential feature descriptors.

18. The system of claim 17, further comprising:
a de-multiplexer component that extracts the encoded visual descriptors and the encoded feature descriptor from the input image data;
a matching component that obtains image patches from an image database by performing image matching based on the local feature descriptors; and
an integration component that stitches the image patches into in an output image that visually resembles the original image.

19. The system of claim 18, wherein the matching component obtains the image patches by selecting candidate images from the image database through matching visual words that describe the candidate images to visual words that describe the local feature descriptors, and retrieving the candidate images as image patches from the image database.

20. The system of claim 18, wherein the local feature descriptors include Scale Invariant Feature Transform (SIFT) descriptors or Speeded Up Robust Feature (SURF) descriptors.

\* \* \* \* \*